US012587547B2

(12) United States Patent
Fujii et al.

(10) Patent No.: US 12,587,547 B2
(45) Date of Patent: Mar. 24, 2026

(54) CONNECTION DESTINATION MALIGNANCY DETERMINATION SYSTEM, CONNECTION DESTINATION MALIGNANCY DETERMINATION PROGRAM, AND CONNECTION DESTINATION MALIGNANCY DETERMINATION METHOD

(71) Applicants: Hitachi, Ltd., Tokyo (JP); National Institute of Information and Communications Technology, Koganei (JP)

(72) Inventors: Shota Fujii, Tokyo (JP); Nobutaka Kawaguchi, Tokyo (JP); Tomohiro Shigemoto, Tokyo (JP); Takayuki Satou, Tokyo (JP); Sho Aoki, Tokyo (JP); Masato Terada, Tokyo (JP); Yu Tsuda, Koganei (JP)

(73) Assignees: HITACHI, LTD., Tokyo (JP); NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 265 days.

(21) Appl. No.: 18/370,610

(22) Filed: Sep. 20, 2023

(65) Prior Publication Data

US 2024/0333729 A1 Oct. 3, 2024

(30) Foreign Application Priority Data

Mar. 31, 2023 (JP) ................................. 2023-057783

(51) Int. Cl.
*H04L 9/40* (2022.01)

(52) U.S. Cl.
CPC ...... *H04L 63/1416* (2013.01); *H04L 63/0236* (2013.01); *H04L 63/1433* (2013.01)

(58) Field of Classification Search
CPC ............. H04L 63/1416; H04L 63/0236; H04L 63/1433; H04L 63/145
See application file for complete search history.

(56) References Cited

U.S. PATENT DOCUMENTS 9,332,023 B1 * 5/2016 Wang ..................... H04L 63/145
9,560,069 B1 * 1/2017 Agarwal ................. H04L 51/04
(Continued)

FOREIGN PATENT DOCUMENTS

CN 101443742 A * 5/2009 ......... H04L 41/0661
CN 116488918 A * 7/2023 ......... H04L 53/1433
(Continued)

OTHER PUBLICATIONS

Zhu et al. English translation of CN 116488918 A. (Year: 2023).*
(Continued)

*Primary Examiner* — Sarah Su
(74) *Attorney, Agent, or Firm* — Procopio, Cory, Hargreaves & Savitch LLP

(57) ABSTRACT

A connection destination malignancy determination system connected to the Internet through a network includes: a connection destination observation unit that observes a connection destination; a connection destination malignancy determination unit that determines a malignancy indicating the degree of maliciousness of the connection destination; and a countermeasure priority determination unit that determines a countermeasure priority indicating the degree of preferential countermeasure required based on the malignancy and an observation result of the connection destination.

20 Claims, 12 Drawing Sheets

(56)                References Cited

U.S. PATENT DOCUMENTS

| | | | | |
|---|---|---|---|---|
| 10,289,841 | B2 * | 5/2019 | Tang | H04L 41/145 |
| 10,462,173 | B1 * | 10/2019 | Aziz | H04L 63/1433 |
| 10,491,621 | B2 | 11/2019 | Ground et al. | |
| 11,303,656 | B2 * | 4/2022 | Kuperman | G06F 21/53 |
| 2013/0298240 | A1 * | 11/2013 | Gerber | H04L 63/1425 |
| | | | | 726/23 |
| 2017/0310687 | A1 * | 10/2017 | Sun | H04L 63/1425 |
| 2023/0362184 | A1 * | 11/2023 | Gelman | H04L 63/1433 |
| 2024/0291835 | A1 * | 8/2024 | Sethi | H04L 63/1425 |
| 2024/0323212 | A1 * | 9/2024 | Fujii | G06F 17/18 |
| 2024/0364725 | A1 * | 10/2024 | Sinha | H04L 63/1416 |
| 2025/0184349 | A1 * | 6/2025 | Singh | G06F 40/30 |
| 2025/0286903 | A1 * | 9/2025 | Fortkort | H04L 63/1416 |

FOREIGN PATENT DOCUMENTS

| | | | | | |
|---|---|---|---|---|---|
| CN | 117955749 | A * | 4/2024 | | G06N 20/20 |
| CN | 119232497 | A * | 12/2024 | | H04L 9/40 |
| CN | 119966659 | A * | 5/2025 | | |
| EP | 3076327 | A1 * | 10/2016 | | H04L 63/0428 |
| GB | 2628920 | A * | 10/2024 | | H04L 9/3239 |
| JP | 2016-45887 | A | 4/2016 | | |
| JP | 2021-93010 | A | 6/2021 | | |
| WO | WO-2016093182 | A1 * | 6/2016 | | G06F 21/56 |
| WO | WO-2016199582 | A1 * | 12/2016 | | G06F 21/56 |
| WO | WO-2024235435 | A1 * | 11/2024 | | G06F 21/552 |

OTHER PUBLICATIONS

Office Action received in corresponding Canadian Patent Application No. 3,212,401, dated Dec. 30, 2024, in 8 pages.

Masood Mansoori, et al. Geolocation tracking and cloaking of malicious web sites. In 2019 IEEE 44th Conference on Local Computer Networks, pp. 274-281, https://ieeexplore.ieee.org/document/8990794.

* cited by examiner

F I G. 1
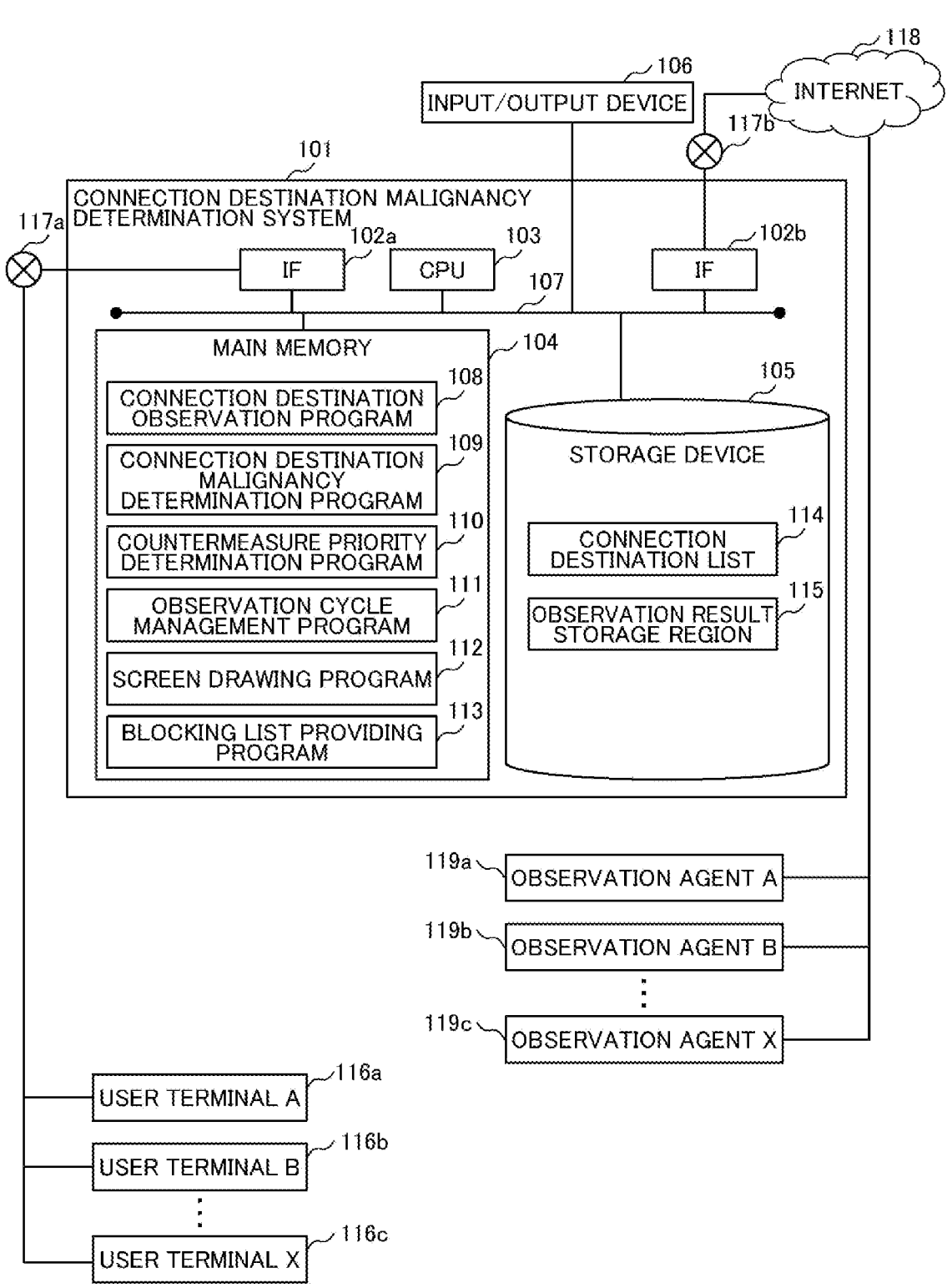

F I G. 2

| CONNECTION DESTINATION ID | CONNECTION DESTINATION | OBSERVATION SPAN | OBSERVATION DATE AND TIME | MALIGNANCY | | | | COUNTERMEASURE PRIORITY |
|---|---|---|---|---|---|---|---|---|
| | | | | TOTAL | CONTENT | REGIONAL DIFFERENCE | TIME-SERIES CHANGE | |
| 0 | search.example.com/ | 4 HOURS | 2022-06-06 18:57:14 | 1.0 | 1.0 | 0.0 | 0.0 | 0.8 |
| | | | 2022-06-06 14:57:14 | 0.2 | 0.2 | 0.0 | 0.0 | 0.1 |
| 1 | 192.0.2.1/c2 | 30 MINUTES | 2022-06-06 15:32:46 | 0.5 | 0.4 | 0.0 | 0.6 | 0.5 |
| | | | 2022-06-06 15:02:46 | 0.5 | 0.4 | 0.0 | 0.6 | 0.5 |
| | | | 2022-06-06 14:57:25 | 0.5 | 0.4 | 0.0 | 0.6 | 0.5 |
| 2 | example.com/hoge | 2 HOURS | 2022-06-06 17:03:12 | 0.1 | 0.0 | 0.0 | 0.3 | 0.4 |
| | | | 2022-06-06 15:03:12 | 1.0 | 0.8 | 1.0 | 0.0 | 1.0 |
| ⋮ | ⋮ | ⋮ | ⋮ | ⋮ | ⋮ | ⋮ | ⋮ | ⋮ |

201  202  203  204  205  206

F I G. 3

| CONNECTION DESTINATION ID | CONNECTION DESTINATION | OBSERVATION DATE AND TIME | AGENT | OBSERVATION RESULT | | |
|---|---|---|---|---|---|---|
| | | | | STATUS CODE | CONTENT | FORMAT |
| 0 | search.example.com/ | 2022-06-06 18:57:14 | JAPAN | 200 | 1.exe | exe |
| | | 2022-06-06 14:57:14 | AMERICA | 200 | 1.exe | exe |
| | | 2022-06-06 15:32:46 | JAPAN | 404 | 404.html | html |
| 1 | 192.0.2.1/c2 | 2022-06-06 14:57:14 | AMERICA | 404 | 404.html | html |
| | | 2022-06-06 15:02:46 | JAPAN | 200 | 2.exe | exe |
| | | | AMERICA | 200 | 2.exe | exe |
| | | 2022-06-06 14:57:25 | JAPAN | 200 | 2.exe | exe |
| | | | AMERICA | 200 | 2.exe | exe |
| | | | JAPAN | 200 | 2.exe | exe |
| | | | AMERICA | 200 | 2.exe | exe |
| 2 | example.com/hoge | 2022-06-06 17:03:12 | JAPAN | 404 | 404.html | html |
| | | | AMERICA | 404 | 404.html | html |
| | | 2022-06-06 15:03:12 | JAPAN | 200 | 3.exe | exe |
| | | | AMERICA | 404 | 404.html | html |
| ⋮ | | | | | | |

301    302    303    304    305

F I G. 4
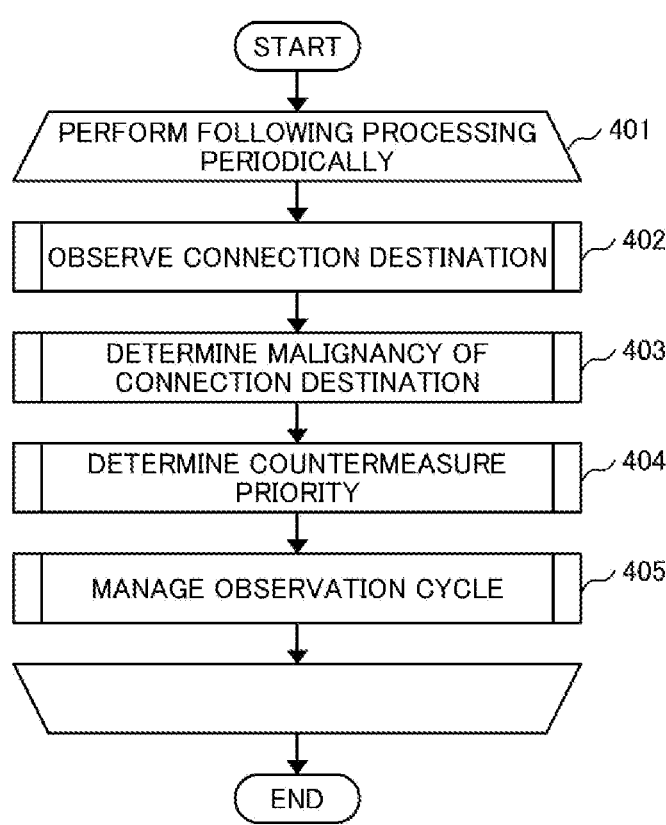

F I G . 5
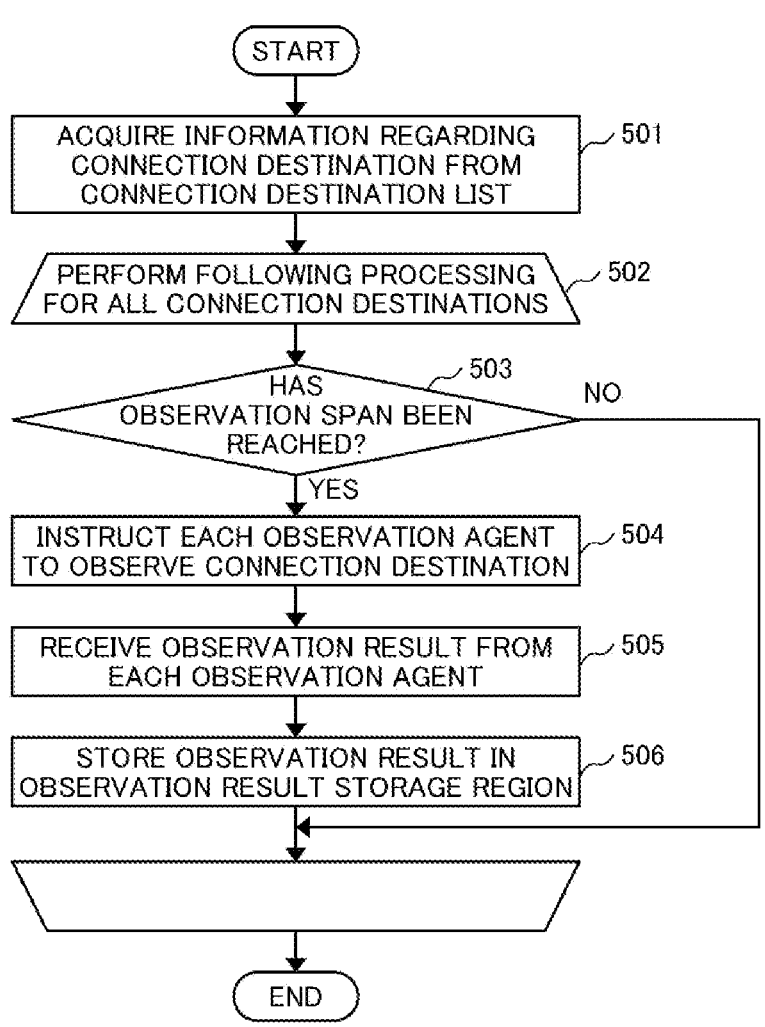

F I G. 6
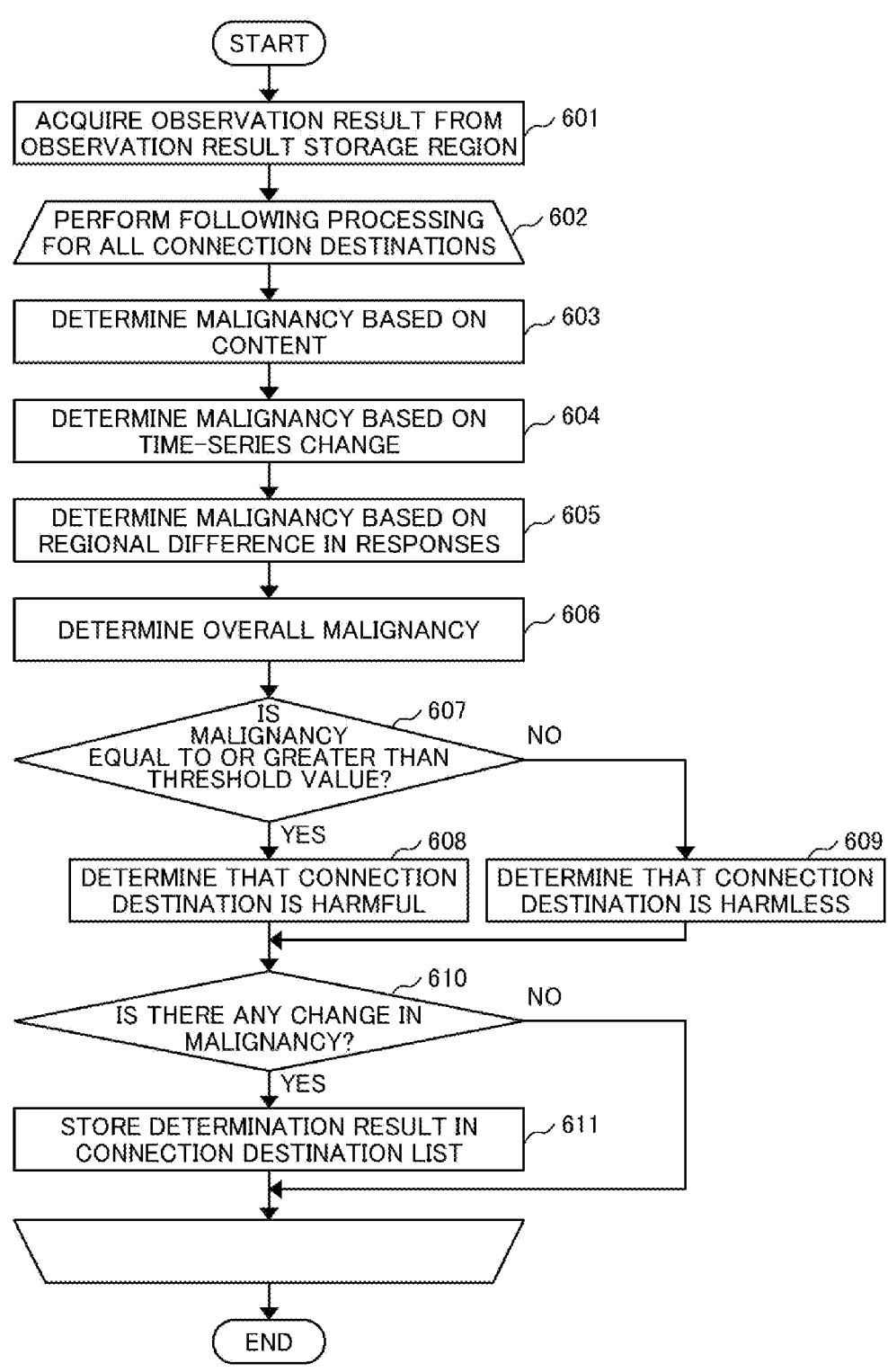

F I G. 7
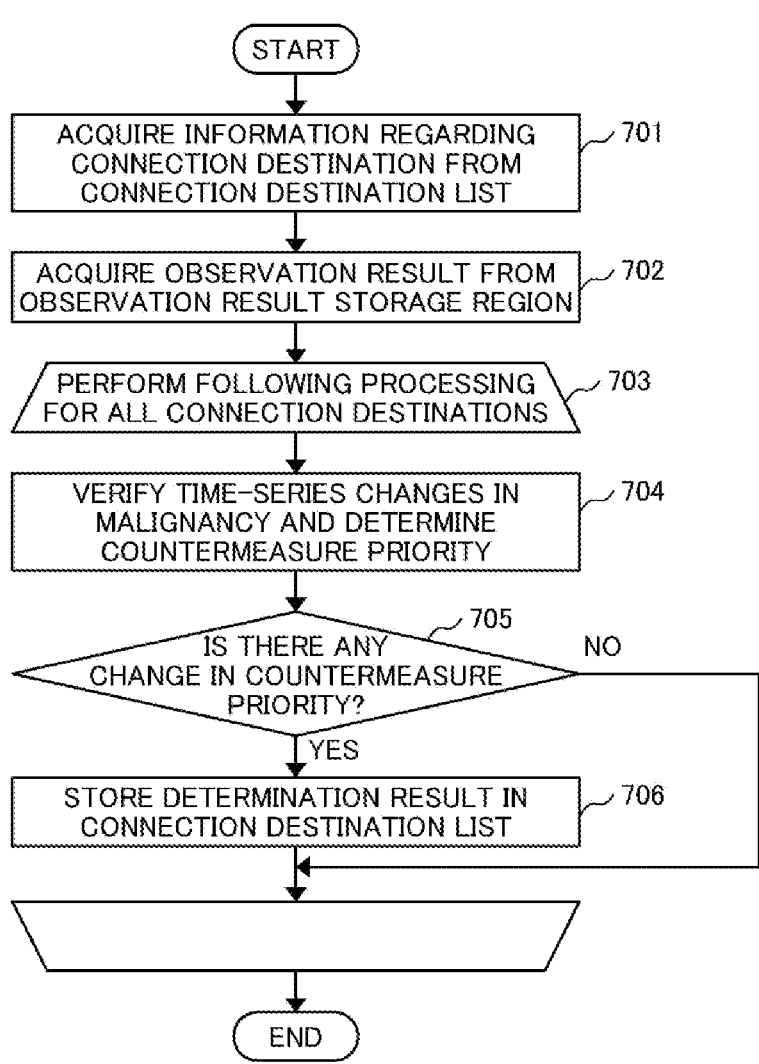

F I G. 8
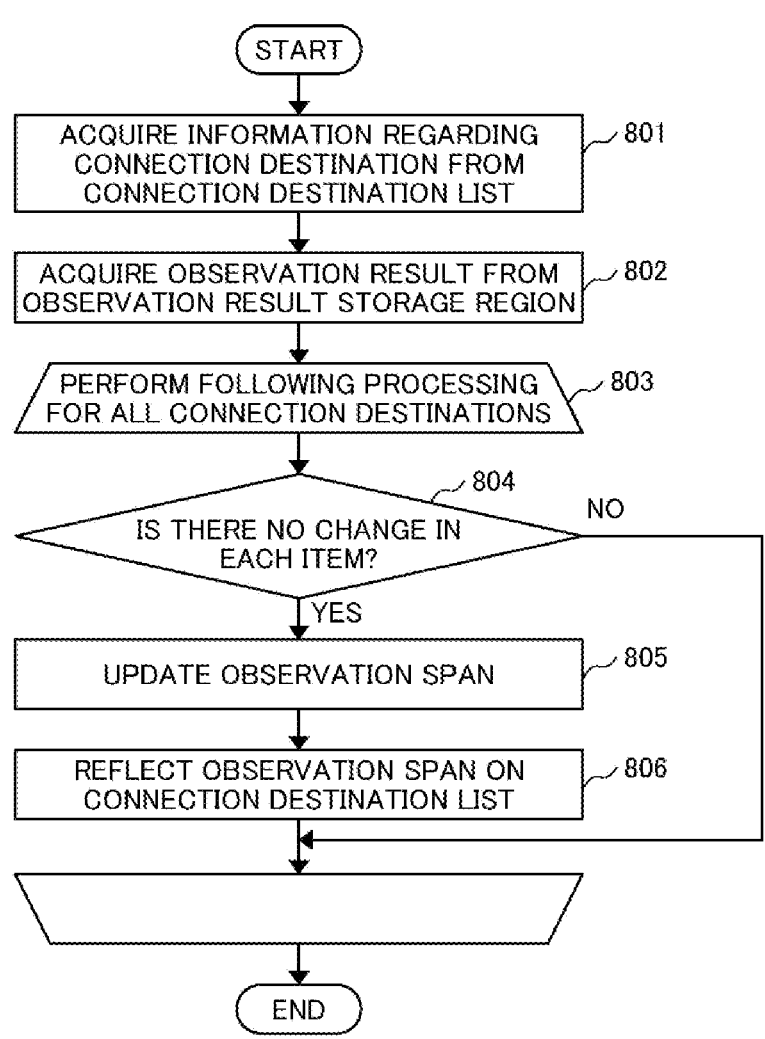

F I G. 9
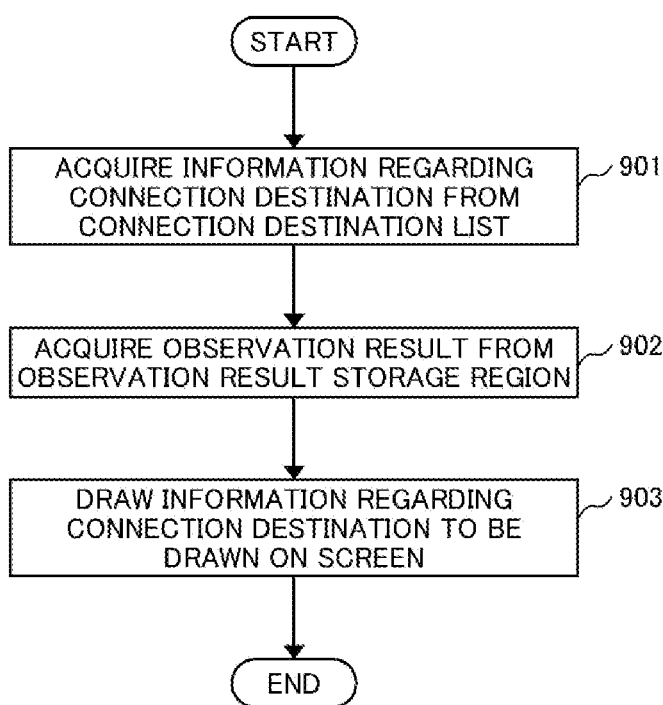

F I G. 1 0
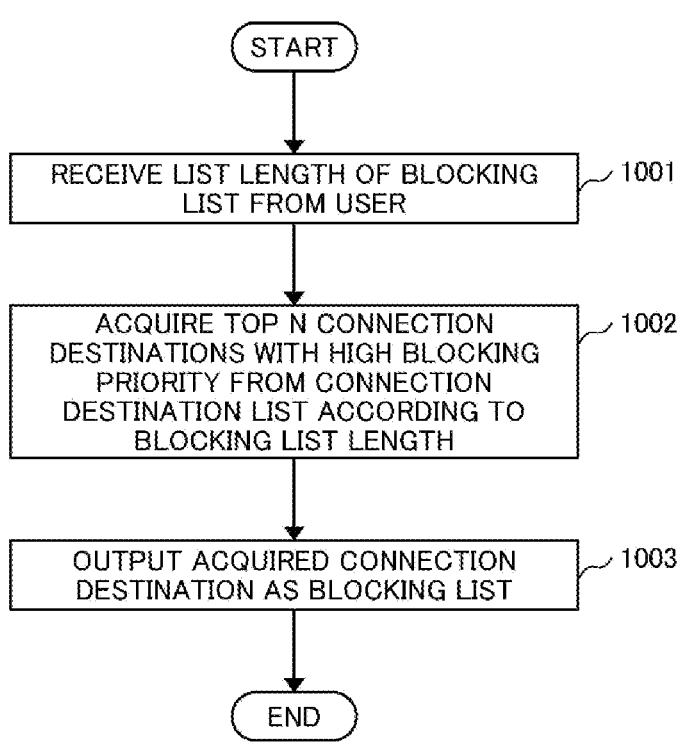

F I G. 1 1
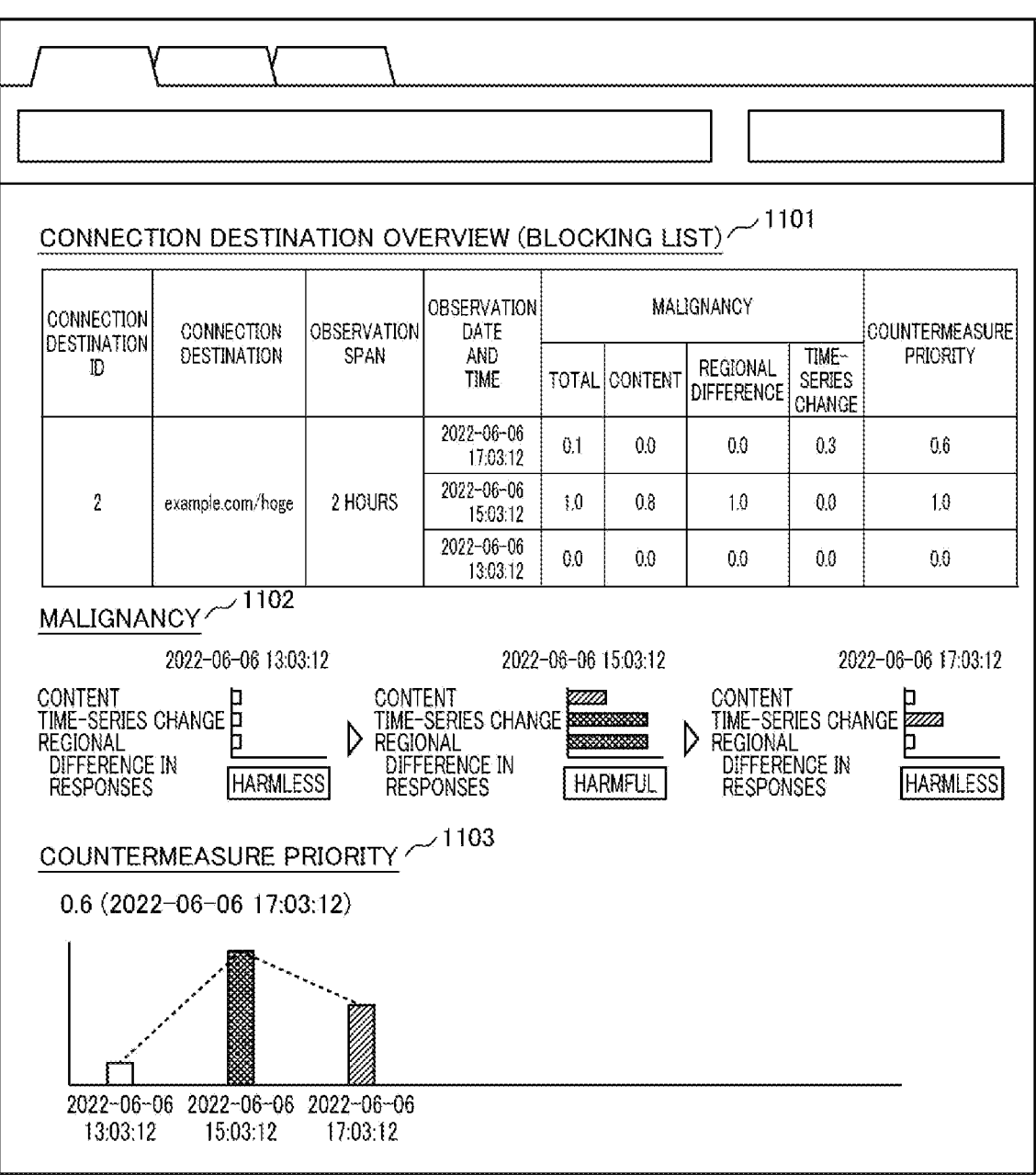

F I G . 1 2
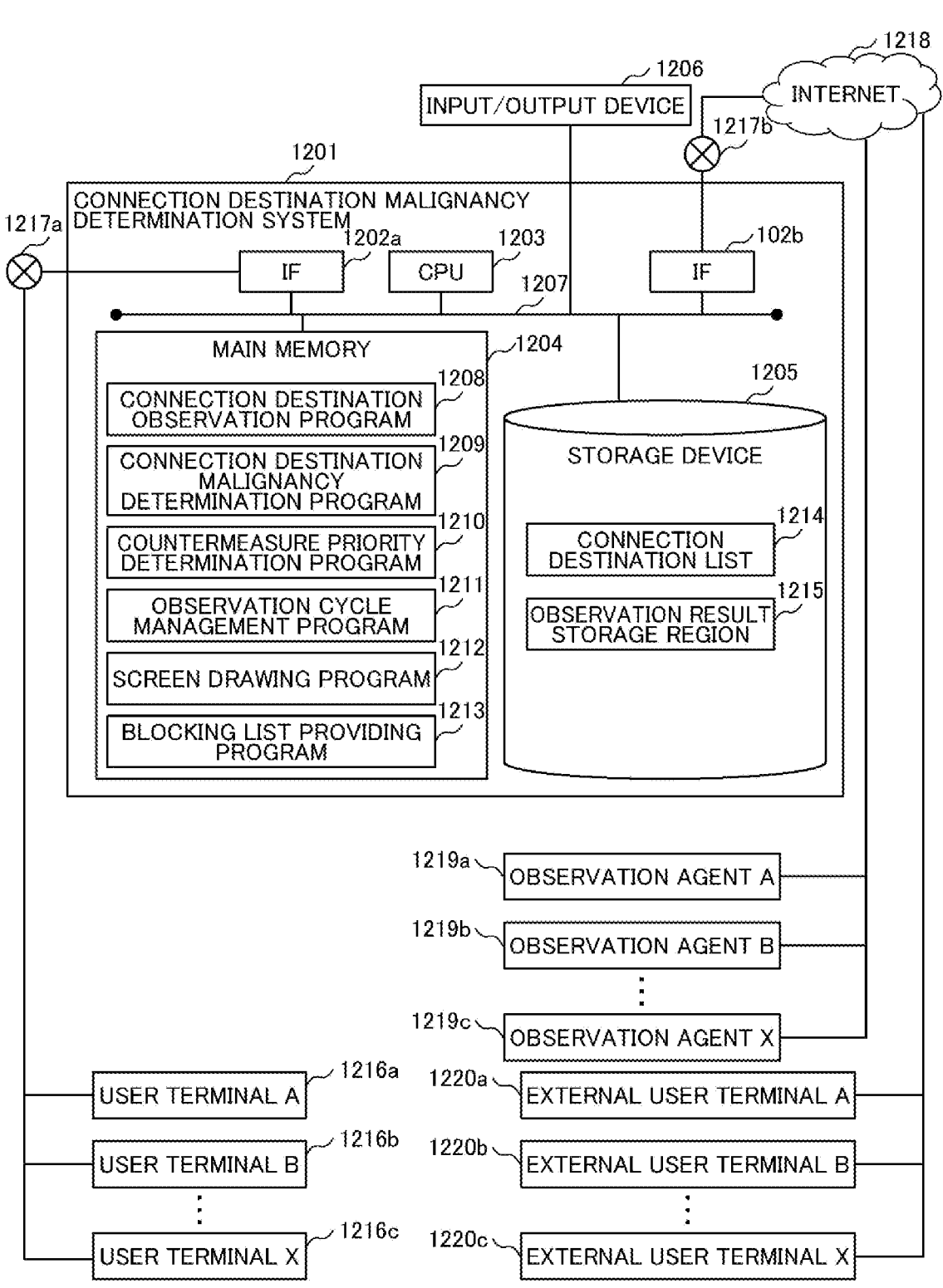

CONNECTION DESTINATION MALIGNANCY DETERMINATION SYSTEM, CONNECTION DESTINATION MALIGNANCY DETERMINATION PROGRAM, AND CONNECTION DESTINATION MALIGNANCY DETERMINATION METHOD

BACKGROUND OF THE INVENTION

1. Field of the Invention

The present invention relates to a connection destination determination system, a connection destination malignancy malignancy determination program, and a connection destination malignancy determination method.

2. Description of the Related Art

Cyberattacks are increasing and becoming more sophisticated year by year, and the need for countermeasures is increasing. As one of the countermeasures, there is a method of blocking communication to malicious hosts of attackers who play an important role in cyberattacks. Here, as a method of blocking communication to malicious hosts, there is a communication control using a blocking list.

This is implemented in a layer such as a forward proxy, and this method is to register in advance malicious hosts whose communication needs to be blocked and cut off the communication to reduce damage when a communication that matches the list is detected. Techniques related to this include, for example, JP 2016-45887 A, JP 2021-93010 A, and Masood Mansoori, et al. Geolocation tracking and cloaking of malicious web sites. In 2019 IEEE 44th Conference on Local Computer Networks, pp. 274-281 ieeexplore.ieee.org/document/8990794.

The number of malicious hosts is increasing year by year along with the increase in cyberattacks. In addition, due to the tendency of throwing away malicious hosts, the number of reported cases is high.

In the actual operation, it is not practical to add all reported malicious hosts to the blocking list, mainly due to resource limitations. Therefore, based on the state at that point in time, it is necessary to focus on those with a high malignancy and block them preferentially.

The determination of the malignancy depends largely on the knowledge of the operator. In addition, as a method of determining the malignancy, it is possible to actually access a malicious host and check its behavior or content. However, there are malicious hosts that operate only at specific times, or the malicious content may be distributed only in specific regions. For this reason, the above determination is made more difficult by the fact that it may not be possible to make a determination based on observation results from a single point in time or a single location.

Summarizing the above, it can be said that the problem is as follows. Based on the state at that point in time, it is necessary to focus on those with a high malignancy and block them preferentially. In this case, it is desirable to make a determination based not only on an observation result at a single point in time or a single location but also on continuous or multi-location observation results. For this reason, the implementation cost is high and dependence on individual skills is high.

JP 2016-45887 A partially solves the problem in terms of determining the malignancy based on the monitoring results.

However, continuous or multi-location observation or prioritization is not taken into consideration.

JP 2021-93010 A partially solves the problem in terms of determining reliability in consideration of time information as well. However, observing from multiple locations in practice, considering regional characteristics, determining the malignancy of reachable hosts regardless of the domain, and the like are not taken into consideration.

In the case of Masood Mansoori, et al. Geolocation tracking and cloaking of malicious web sites. In 2019 IEEE 44th Conference on Local Computer Networks, pp. 274-281, ieeexplore.ieee.org/document/8990794, observation is performed only at a specific point in time, and continuous observation or the determination of cutoff priority at the point in time of observation is not performed.

As described above, there are related arts that partially solve the above problem. However, when determining the malignancy of a malicious host, factors such as time and regional characteristics are often not taken into consideration. In addition, it can be said that there is a problem that the priority of countermeasures required in actual work is not assigned.

SUMMARY OF THE INVENTION

It is an object of the present invention to support work related to determination of the malignancy of a connection destination or blocking of the connection destination by automatically determining the malignancy and the countermeasure priority of a suspicious connection destination in a connection destination malignancy determination system.

A connection destination malignancy determination system according to an aspect of the present invention is a connection destination malignancy determination system connected to the Internet through a network, and includes: a connection destination observation unit that observes a connection destination; a connection destination that determination unit malignancy determines a malignancy indicating a degree of maliciousness of the connection and destination; a countermeasure priority determination unit that determines a countermeasure priority indicating a degree of preferential countermeasure required based on the malignancy and an observation result of the connection destination.

According to the aspect of the present invention, it is possible to support the work related to the determination of the malignancy of the connection destination or the blocking of the connection destination by automatically determining the malignancy and the countermeasure priority of a suspicious connection destination in the connection destination malignancy determination system.

BRIEF DESCRIPTION OF THE DRAWINGS

FIG. 1 is a diagram showing a configuration example of a connection destination malignancy determination system according to a first embodiment of the present invention;

FIG. 2 is a diagram showing an example of a connection destination list according to the first embodiment of the present invention;

FIG. 3 is a diagram showing an example of an observation result storage region according to the first embodiment of the present invention;

FIG. 4 is a diagram showing an overall processing flow according to the first embodiment of the present invention;

FIG. 5 is a diagram showing a processing flow of connection destination observation according to the first embodiment of the present invention;

FIG. 6 is a diagram showing a processing flow of connection destination malignancy determination according to the first embodiment of the present invention;

FIG. 7 is a diagram showing a processing flow of countermeasure priority determination according to the first embodiment of the present invention;

FIG. 8 is a diagram showing a processing flow of observation cycle management according to the first embodiment of the present invention;

FIG. 9 is a diagram showing a processing flow of screen drawing according to the first embodiment of the present invention;

FIG. 10 is a diagram showing a processing flow of providing a blocking list according to the first embodiment of the present invention;

FIG. 11 is a diagram showing an example of a connection destination observation result drawing screen according to the first embodiment of the present invention; and FIG. 12 is a diagram showing a configuration example of a connection destination malignancy determination system according to a second embodiment of the present invention.

DETAILED DESCRIPTION OF THE PREFERRED EMBODIMENTS

Hereinafter, embodiments of the present invention will be described with reference to the diagrams. However, the present invention should not be construed as being limited to the description of the embodiments below. It is easily understood by those skilled in the art that the specific configuration can be changed without departing from the idea or the spirit of the present invention.

In the configurations of the present invention described below, the same or similar configurations or functions are denoted by the same reference numerals, and repeated descriptions will be omitted.

The notations such as "first", "second", and "third" in this specification and the like are attached to identify the components, and do not necessarily limit the number or the order.

The position, size, shape, range, and the like of each configuration shown in the diagrams and the like may not represent the actual position, size, shape, range, and the like in order to facilitate understanding of the present invention. Therefore, the present invention is not limited to the positions, sizes, shapes, ranges, and the like disclosed in the diagrams and the like.

First Embodiment

In a first embodiment, the processing of a connection destination malignancy determination system when determining the malignancy and a countermeasure priority of a malicious host on-premise will be described.

FIG. 1 is a diagram showing a configuration example of a connection destination malignancy determination system according to an embodiment of the present invention.

The Internet 118 is connected to a connection destination malignancy determination system 101 according to the first embodiment through a network 117*b*. In addition, a user terminal 116 operated by a user is connected to the connection destination malignancy determination system 101 through a network 117*a*. In addition, an observation agent 119 is connected to the Internet 118.

The connection destination malignancy determination system 101 is a computer including a CPU (central processing unit) 103, a main memory 104 for storing data necessary for the CPU 103 to execute processing, a storage device 105 such as a hard disk or a flash memory having a capacity to store a large amount of data, an IF (interface) 102 for performing communication with other devices, an input/output device 106 for input and output of a keyboard, a display, and the like, and a communication path 107 for connecting these devices to each other. In addition, the communication path 107 is, for example, an information transmission medium such as a bus or a cable.

The CPU 103 forms a connection destination observation unit that observes a connection destination by executing a connection destination observation program 108 stored in the main memory 104.

In addition, the CPU 103 forms a connection destination malignancy determination unit that determines the malignancy of the connection destination by executing a connection destination malignancy determination program 109 stored in the main memory 104. The connection destination malignancy determination unit determines a malignancy indicating the degree of maliciousness of the connection destination. Here, the determination of the malignancy can be performed by machine learning, for example.

In addition, the CPU 103 forms a countermeasure priority determination unit that determines a countermeasure priority by executing a countermeasure priority determination program 110 stored in the main memory 104. The countermeasure priority determination unit determines a countermeasure priority indicating the degree of preferential countermeasure required. Here, the determination of the countermeasure priority can be performed by machine learning, for example.

In addition, the CPU 103 forms an observation cycle management unit that manages an observation cycle by executing an observation cycle management program 111 stored in the main memory 104.

In addition, the CPU 103 forms a screen drawing unit that presents the user with information regarding the connection destination, which has been observed and for which the malignancy and the countermeasure priority has been determined by the program group, by executing a screen drawing program 112 stored in the main memory 104.

In addition, the CPU 103 forms a blocking list providing unit that provides a blocking list related to connection destinations with a high countermeasure priority by executing a blocking list providing program 113 stored in the main memory 104.

The storage device 105 stores a connection destination list 114 for managing connection destinations and an observation result storage region 115 for storing observation results.

Each of the above programs or data may be stored in the main memory 104 or the storage device 105 in advance, or may be installed (loaded) from another device through the input/output device 106 or the IF 102 when necessary.

In addition, the configuration of the connection destination malignancy determination system described with reference to FIG. 1 is an example, and the present invention is not limited thereto.

FIG. 2 is a diagram showing an example of the connection destination list 114. As shown in FIG. 2, the connection destination list 114 includes, for example, a connection destination ID 201, a connection destination 202, an observation span 203, an observation date and time 204, a malignancy 205, and a countermeasure priority 206.

The connection destination ID 201 is a field in which identification information for uniquely identifying a connection destination to be observed is stored. In the connection destination ID 201 of the first embodiment, a number is stored as identification information.

The connection destination 202 is a field in which the URL of the connection destination to be observed is stored. For example, a connection destination corresponding to an entry with the connection destination ID 201 of "0" is "search.example.com/".

The observation span 203 indicates a frequency of observing the connection destination. For example, the entry with the connection destination ID 201 of "0" indicates that observation is attempted every four hours.

The observation date and time 204 indicates the date and time when the connection destination was observed. For example, among the entries with the connection destination ID 201 of "0", the most recent observation was performed at 18:57:14 on Jun. 6, 2022. The present invention is not limited to the data format of the time stored in the observation date and time 204. Any data format, such as Unix-time, may be used as long as the time can be determined.

The malignancy 205 indicates the malignancy of the connection destination at each observation time. For example, for the malignancy of the entry with the connection destination ID 201 of "0" observed at "18:57:14 on Jun. 6, 2022", the malignancy in terms of content is "1.0", the malignancy in terms of regional differences is "0.0", the malignancy in terms of time-series change is "0.0", and the overall malignancy obtained by adding these is "1.0". In addition, the viewpoint for determining the malignancy is not limited to this.

The countermeasure priority 206 is a field in which the countermeasure priority of the connection destination is stored. For example, the countermeasure priority of the entry with the connection destination ID 201 of "0" observed at "18:57:14 on Jun. 6, 2022" is "0.8".

In addition, the connection destination list described with reference to FIG. 2 is an example, and the present invention is not limited thereto.

FIG. 3 is a diagram showing an example of the observation result storage region 115. As shown in FIG. 3, the observation result storage region 115 includes, for example, a connection destination ID 301, a connection destination 302, an observation date and time 303, an agent 304, and an observation result 305.

The connection destination ID 301 is a field in which identification information for uniquely identifying a connection destination to be observed is stored. In the connection destination ID 301 of the first embodiment, a number is stored as identification information.

The connection destination 302 is a field in which the URL of the connection destination to be observed is stored. For example, a connection destination corresponding to an entry with the connection destination ID 301 of "0" is "search.example.com/".

The observation date and time 303 indicates the date and time when the connection destination was observed. For example, among the entries with the connection destination ID 301 of "0", the most recent observation was performed at 18:57:14 on Jun. 6, 2022. The present invention is not limited to the data format of the time stored in the observation date and time 303. Any data format, such as Unix-time, may be used as long as the time can be determined.

The agent 304 is a field in which information on an agent who performs observation is stored. For example, in the present embodiment, this indicates that the agent "Japan"

and the agent "America" were used for observation. In the present embodiment, an area where the agent is located is used as the agent's information. However, any information may be used as long as the format enables the determination of the agent.

The observation result 305 is a field in which observation results are stored. For example, the observation result of the entry with the connection destination ID 301 of "0" observed by the agent "Japan" at "18:57:14 on Jun. 6, 2022" indicates that the status code is "200", the content is "1. exe", and the format is "exe". In addition, information stored as the observation result is not limited to this.

In addition, the observation result storage region described with reference to FIG. 3 is an example, and the present invention is not limited thereto.

Next, processing performed by the connection destination malignancy determination system 101 will be described.

FIG. 4 is a flowchart describing an outline of processing performed by the connection destination malignancy determination system 101 according to the first embodiment.

The connection destination malignancy determination system 101 periodically performs processing described below (step 401).

First, a connection destination is observed (step 402). Details of the observation of the connection destination will be described with reference to FIG. 5.

Then, the malignancy of the connection destination is determined by using the observation result (step 403). Details of the determination of the malignancy of the connection destination will be described with reference to FIG. 6.

Then, countermeasure the priority of connection the destination is determined by using the observation result or the malignancy (step 404). Details of the determination of the countermeasure priority will be described with reference to FIG. 7.

Then, processing for managing the observation cycle for the connection destination is performed (step 405). Details of the management of the observation cycle for the connection destination will be described with reference to FIG. 8.

The above processing is performed for all observation targets, and the processing ends after completion.

In addition, the processing flow of the connection destination malignancy determination system described with reference to FIG. 4 is an example, and the present invention is not limited thereto.

FIG. 5 is a flowchart illustrating an example of connection destination observation processing performed by the connection destination malignancy determination system 101 according to the first embodiment.

The connection destination observation program 108 executed by the CPU 103 starts processing described below when an execution instruction is received.

The connection destination observation program 108 acquires a list of connection destinations to be observed from the connection destination list 114 (step 501). Here, it is assumed that a list including entries with the connection destination ID 201 is acquired.

Then, the connection destination observation program 108 performs observation based on the acquired connection destination list (step 502). If there is no connection destination to be observed, the process ends. If there is one or more connection destinations, the process proceeds to step 503.

Then, the connection destination observation program 108 determines whether or not the connection destination has reached the observation span by calculating the elapsed time from the last observation date and time of the connection destination to program execution with reference to the observation date and time 204 and the observation span 203 in the most recent entry in the connection destination list 114 (step 503).

At this time, if the connection destination has not reached the observation span, the processing related to the connection destination ends. If the connection destination has reached the observation span, the process proceeds to step 504.

Then, the connection destination observation program 108 instructs each observation agent 119 to observe the connection destination (step 504).

Then, the connection destination observation program 108 receives an observation result for the connection destination from each observation agent 119 (step 505).

Then, the connection destination observation program 108 stores the observation result received from each observation agent 119 in the entry corresponding to the connection destination ID of the connection destination in the observation result storage region 115 (step 506).

In addition, the connection destination observation method described with reference to FIG. 5 is an example, and the present invention is not limited thereto. For example, although the processing for observing all the connection destinations included in the connection destination list 114 has been described, only the connection destinations with high reliability may be preferentially observed by using the reliability of the information source. In addition, if there is a connection destination that is likely to be accessed by a target client or an organization to be protected, this connection destination may be preferentially observed.

FIG. 6 is a flowchart describing an example of connection destination malignancy determination processing performed by the connection destination malignancy determination system 101 according to the first embodiment.

The connection destination malignancy determination program 109 executed by the CPU 103 starts processing described below when an execution instruction is received.

The connection destination malignancy determination program 109 acquires a list of connection destination observation results from the observation result storage region 115 (step 601). Here, it is assumed that a list including entries with the connection destination ID 301 is acquired.

Then, the connection destination malignancy determination program 109 executes the following processing for all connection destinations based on the acquired observation result list (step 602). If there is no connection destination with an observation result, the process ends. If there is one or more connection destinations having observation results, the process proceeds to step 603.

Then, the connection destination malignancy determination program 109 executes malignancy determination processing based on the content (step 603). For example, the malignancy of a file downloaded from the connection destination is determined. In addition, it is determined that the connection destination is malicious by detecting a malicious script included in the web page.

Then, the connection destination malignancy determination program 109 executes malignancy determination processing based on a time-series change (step 604). For example, when the connection destination changes from a non-responsive state to a responsive state, this is regarded as a sign of the start or resumption of an attack, and it is determined that there is a possibility of maliciousness.

Then, the connection destination malignancy determination program 109 executes malignancy determination processing based on a regional difference in responses (step 605). For example, results obtained by observing the connection destination by a plurality of agents are compared. If there is a difference between the responses in the respective regions, it is regarded that there is a possibility of an attack targeting a specific region, and it is determined that there is a possibility of maliciousness.

Then, the connection destination malignancy determination program 109 performs comprehensive malignancy determination processing for the connection destination based on the determination results so far (step 606).

The connection destination malignancy determination program 109 determines whether or not the malignancy is equal to or greater than a predetermined threshold value (step 607). As a result of the determination, it is determined that the connection destination is harmful if the malignancy is equal to or greater than the threshold value (step 608), and it is determined that the connection destination is harmless if the malignancy is less than the threshold value (step 609).

Then, the connection destination malignancy determination program 109 compares the determination results so far with the past determination results, and verifies whether or not there is any change in the malignancy (step 610). If there is no change, the connection destination malignancy determination processing ends. At this time, if the malignancy determination processing has been performed for all connection destinations, the processing ends. If there is a change, the process proceeds to step 611.

Then, the connection destination malignancy determination program 109 reflects the malignancy determination result in the malignancy 205 of the connection destination list 114 (step 611). At this time, if the malignancy determination processing has been performed for all connection destinations, the processing ends.

In addition, the connection destination malignancy determination method described with reference to FIG. 6 is an example, and the present invention is not limited thereto. For example, depending on the observation result, not only the connection destination but also correlated connection destinations, such as those reported around the same time or reported to be used in the same attack, may be determined to be malignant.

FIG. 7 is a flowchart describing an example of countermeasure priority determination processing performed by the connection destination malignancy determination system 101 according to the first embodiment.

The countermeasure priority determination program 110 executed by the CPU 103 starts processing described below when an execution instruction is received.

The countermeasure priority determination program 110 acquires a list of connection destinations to be observed from the connection destination list 114 (step 701). Here, it is assumed that a list including entries with the connection destination ID 201 is acquired.

The countermeasure priority determination program 110 acquires a list of connection destination observation results from the observation result storage region 115 (step 702). Here, it is assumed that a list including entries with the connection destination ID 301 is acquired.

Then, the countermeasure priority determination program 110 executes the following processing for all connection destinations based on the acquired connection destination list and observation result list (step 703). If there is no connection destination or observation result, the process ends. If there is one or more connection destinations having observation results, the process proceeds to step 704.

Then, the countermeasure priority determination program 110 performs countermeasure priority determination processing based on time-series changes in malignancy (step 704). For example, if the malignancy of the connection destination is increasing in time series, it is determined that a preferential countermeasure is to be taken, and the priority is increased.

Then, the countermeasure priority determination program 110 compares the countermeasure priority determination result with the past determination results, and verifies whether or not there is any change in the countermeasure priority (step 705). If there is no change, the countermeasure priority determination processing for the connection destination ends. At this time, if the countermeasure priority determination processing has been performed for all connection destinations, the processing ends. If there is a change, the process proceeds to step 706.

Then, the countermeasure priority determination program 110 reflects the countermeasure priority determination result on the countermeasure priority 206 of the connection destination list 114 (step 706). At this time, if the countermeasure priority determination processing has been performed for all connection destinations, the processing ends.

In addition, the countermeasure priority determination method described with reference to FIG. 7 is an example, and the present invention is not limited thereto. For example, the countermeasure priority of a connection destination with a large response difference between regions and likely to target a specific region, that is, the countermeasure priority of a connection destination likely to be used in more advanced attacks, may be increased. In this case, the priority may be determined according to whether or not the own organization or region is the target of attack. In addition to the malignancy, other factors may be used. For example, the attack target of the malicious connection destination may be compared with the computer information of the own organization, and the countermeasure priority may be determined according to whether or not there is an influence.

FIG. 8 is a flowchart describing an example of observation cycle management processing performed by the connection destination malignancy determination system 101 according to the first embodiment.

The observation cycle management program 111 executed by the CPU 103 starts processing described below when an execution instruction is received.

The observation cycle management program 111 acquires a list of connection destinations to be observed from the connection destination list 114 (step 801). Here, it is assumed that a list including entries with the connection destination ID 201 is acquired.

The observation cycle management program 111 acquires a list of connection destination observation results from the observation result storage region 115 (step 802). Here, it is assumed that a list including entries with the connection destination ID 301 is acquired.

Then, the observation cycle management program 111 executes the following processing for all connection destinations based on the acquired connection destination list and observation result list (step 803). If there is no connection destination or observation result, the process ends. If there is one or more connection destinations having observation results, the process proceeds to step 804.

Then, the observation cycle management program 111 verifies whether or not there is a change in each item of the connection destination (step 804). If there is no change, observation cycle management processing for the connection destination ends. At this time, if the observation cycle management processing has been performed for all connection destinations, the processing ends. If there is a change, the process proceeds to step 805.

Then, the observation cycle management program 111 updates the observation span based on the change in each item of the connection destination (step 805). For example, when the connection destination changes from a non-responsive state to a responsive state, this is regarded as a sign of the start or resumption of an attack, and it is determined that more frequent observation is necessary and the observation span is shortened.

Then, the observation cycle management program 111 reflects the updated observation span of the connection destination on the observation span 203 of the connection destination list 114 (step 806). At this time, if the observation cycle management processing has been performed for all connection destinations, the processing ends.

In addition, the observation cycle management method described with reference to FIG. 8 is an example, and the present invention is not limited thereto. For example, if there is no change in the connection destination, it may be determined that frequent observation is not necessary, and the observation span may be increased.

In addition to the processing described with reference to FIG. 4, the connection destination malignancy determination system 101 performs screen drawing processing for displaying various kinds of information for the user.

FIG. 9 is a flowchart describing an example of screen drawing processing performed by the connection destination malignancy determination system 101 according to the first embodiment.

The screen drawing program 112 executed by the CPU 103 starts processing described below when an execution instruction is received.

The screen drawing program 112 acquires a list of connection destinations to be observed from the connection destination list 114 (step 901). Here, it is assumed that a list including entries with the connection destination ID 201 is acquired.

The screen drawing program 112 acquires a list of connection destination observation results from the observation result storage region 115 (step 902). Here, it is assumed that a list including entries with the connection destination ID 301 is acquired.

The screen drawing program 112 draws information regarding the connection destination to be drawn on the screen (step 903), and ends the process.

In addition, the screen drawing method described with reference to FIG. 9 is an example, and the present invention is not limited thereto.

In addition to the processing described with reference to FIG. 4, the connection destination malignancy determination system 101 performs blocking list provision processing for providing a blocking list to the user.

FIG. 10 is a flowchart describing an example of blocking list provision processing performed by the connection destination malignancy determination system 101 according to the first embodiment.

The blocking list providing program 113 executed by the CPU 103 starts processing described below when an execution instruction is received.

The blocking list providing program 113 receives the list length of the blocking list from the user (step 1001).

The blocking list providing program 113 acquires top N connection destinations with the high blocking priority from the connection destination list 114 according to the blocking list length (step 1002).

The blocking list providing program 113 outputs the acquired connection destinations as a blocking list (step 1003), and ends the process. At this time, other devices, for example, a network device that actually blocks communication, may be cooperatively used through the IF 102.

In addition, the blocking list providing method described with reference to FIG. 10 is an example, and the present invention is not limited thereto. For example, instead of using the blocking list providing program 113, the blocking list may be constructed manually from a connection destination observation result drawing screen described in FIG. 11.

FIG. 11 is an example of a connection destination observation result drawing screen generated by a program forming the connection destination malignancy determination system 101 according to the first embodiment.

The screen in FIG. 11 includes a connection destination overview 1101, a malignancy 1102, and a countermeasure priority 1103. Here, the connection destination overview 1101 indicates a blocking list.

The connection destination overview 1101 is basic information regarding the connection destination to be drawn. For example, the connection destination overview 1101 includes a connection destination, an observation span, an observation date and time, a malignancy, and a countermeasure priority.

The malignancy 1102 is detailed information regarding the malignancy. For example, the malignancy 1102 includes information in which each element of the malignancy is visualized in time series. In this manner, by showing which factor contributes to the malignancy determination to what extent, the interpretability is improved to support the analyst who finally determines whether or not to perform blocking.

The countermeasure priority 1103 is detailed information regarding the countermeasure priority. For example, the countermeasure priority 1103 includes information in which the countermeasure priority is visualized in time series.

By displaying the information described above, it is expected to improve the visibility of information regarding the connection destinations of users, including analysts, and reduce the implementation cost or dependence on individual skills when determining the necessity of countermeasures against the connection destination.

In addition, although the drawing screen is exemplified this time based on the analysis result of each program according to the first embodiment, this is merely an example, and the present invention is not limited thereto. For example, any information may be drawn in any format as long as the information is related to the connection destination.

In dealing with malicious connection destinations, the determination of the malignancy and the determination of the countermeasure priority depends largely on the knowledge of the person in charge. For this reason, together with the evasive behavior on the attacker side, the issues were high implementation cost and high dependence on individual skills.

According to the first embodiment, the connection destination malignancy determination system 101 observes connection destinations from the observation agents 119 located in a plurality of regions, and automatically determines the malignancy and the countermeasure priority based on the results. As a result, it is possible to reduce the cost or dependence on individual skills in dealing with malicious connection destinations.

Second Embodiment

In a second embodiment, in addition to determining the malignancy and the countermeasure priority of a malicious host on-premise, the determination results are shared externally through a network. This makes it possible to provide services in the cloud.

Hereinafter, the second embodiment will be described focusing on the differences from the first embodiment.

FIG. 12 is a diagram showing a configuration example of a connection destination malignancy determination system 1201 according to the second embodiment of the present invention. The configuration of a computer system according to the second embodiment is the same as that in the first embodiment.

In FIG. 12, reference numeral 1202*a* denotes an interface component of the connection destination malignancy determination system 1201, reference numeral 1203 denotes a data processing module, reference numeral 1204 denotes a communication interface for external connections, reference numeral 1205 denotes a security module, reference numeral 1206 denotes a database management component, reference numeral 1207 denotes a user authentication module, reference numeral 1214 denotes a cloud service interface, reference numeral 1215 denotes a network monitoring component, reference numeral 1217*a* denotes a data transmission pathway, and reference numerals 1219*a-c* denote multiple observation points for regional monitoring of connection destinations.

The hardware configuration of the connection destination malignancy determination system according to the second embodiment includes an external user terminal 1220 in addition to that in the first embodiment. In the second embodiment, each program executes processing in response to requests from not only a user terminal 1216 within the network but also the external user terminal 1220, and returns the result to the external user terminal 1220 through the Internet 1218. This makes it possible to provide services in the cloud.

The programs according to the second embodiment are the same as those according to the first embodiment. In addition, processes performed by a connection destination observation program 1208, a connection destination malignancy determination program 1209, a countermeasure priority determination program 1210, an observation cycle management program 1211, a screen drawing program 1212, and a blocking list providing program 1213 according to the second embodiment are the same as those in the first embodiment. The data structure of the second embodiment is the same as that of the first embodiment.

In addition, the configuration of the connection destination malignancy determination system according to the second embodiment described with reference to FIG. 12 is an example, and the present invention is not limited thereto.

According to the second embodiment, the connection destination malignancy determination system 1201 provides the malignancy and the countermeasure priority of the connection destination to internal users on-premises in the same manner as in the first embodiment, while providing the same information to external users through the Internet 1218. This makes it possible to provide services in the cloud.

In addition, by utilizing the information of external users when determining the malignancy and determining the countermeasure priority, it is possible to provide a determination result suitable for each external user. For example, a region to which each external user belongs and the attack target region of the connection destination may be compared or the computer environment of each external user and the attack target device of the connection destination may be compared, and the malignancy and the countermeasure priority may be increased or decreased according to the result.

According to the embodiment described above, by automatically calculating the countermeasure priority of a malicious host and showing the calculation result together with the determination factors, it is possible to reduce the implementation cost or dependence on individual skills when determining the necessity of countermeasures.

What is claimed is:

1. A connection destination malignancy determination system connected to the Internet through a network, the connection destination malignancy determination system comprising:
a processor coupled to a memory storing instructions for the processor to function as:
a connection destination observation unit that observes a connection destination using observation agents located in multiple geographic regions;
a connection destination malignancy determination unit that determines a malignancy indicating a degree of maliciousness of the connection destination; and
a countermeasure priority determination unit that determines a countermeasure priority indicating a degree of preferential countermeasure required based on the malignancy, regional differences in observation results from the multiple geographic regions, and an observation result of the connection destination,
wherein the connection destination observation unit observes connection destinations by instructing multiple observation agents to access URLs and receive observation results including status codes, content files, and file formats,
wherein the connection destination malignancy determination unit determines malignancy by executing machine learning algorithms that analyze downloaded executable files, detect malicious scripts in web pages, compare time-series response changes, and evaluate regional response differences, and
wherein the countermeasure priority determination unit calculates priority values using automated algorithms that process malignancy data and observation results to generate blocking lists for network security devices.

2. The connection destination malignancy determination system according to claim 1, wherein the processor further functions as:
an observation cycle management unit that manages an observation cycle for the connection destination and determines a monitoring cycle for the connection destination;
a screen drawing unit that presents information regarding the connection destination, the malignancy, and the countermeasure priority; and
a blocking list providing unit that provides, as a blocking list, the connection destination for which the countermeasure priority and the malignancy are high.

3. The connection destination malignancy determination system according to claim 2,
wherein the observation cycle management unit updates the observation cycle based on a change in the connection destination.

4. The connection destination malignancy determination system according to claim 3,
wherein the observation cycle management unit shortens the observation cycle when the connection destination changes from a non-response state to a responsive state.

5. The connection destination malignancy determination system according to claim 2,
wherein the screen drawing unit draws a connection destination observation result drawing screen on a terminal based on observation result of the connection destination, the malignancy, and the countermeasure priority, and
the connection destination observation result drawing screen displays the blocking list and displays the malignancy and the countermeasure priority visualized in time series.

6. The connection destination malignancy determination system according to claim 1,
wherein the connection destination malignancy determination unit determines whether or not the malignancy is equal to or greater than a predetermined threshold value, and determines that the connection destination is harmful when the malignancy is equal to or greater than the threshold value and determines that the connection destination is harmless when the malignancy is less than the threshold value.

7. The connection destination malignancy determination system according to claim 1,
wherein the connection destination malignancy determination unit performs malignancy determination processing based on content of the connection destination, malignancy determination processing based on time-series changes in the connection destination, and malignancy determination processing based on regional differences in responses from the connection destination.

8. The connection destination malignancy determination system according to claim 7,
wherein, as the malignancy determination processing is performed based on the content, the connection destination malignancy determination unit determines the malignancy of a file downloaded from the connection destination.

9. The connection destination malignancy determination system according to claim 7,
wherein, as the malignancy determination processing is performed based on the time-series changes, the connection destination malignancy determination unit determines that the malignancy is high when the connection destination changes from a non-responsive state to a responsive state.

10. The connection destination malignancy determination system according to claim 7,
wherein, as the malignancy determination processing is performed based on the regional differences in the responses, the connection destination malignancy determination unit compares results obtained by observing the connection destination in a plurality of regions, and determines that the malignancy is high when there is a difference between the responses in the respective regions.

11. The connection destination malignancy determination system according to claim 1,
wherein the countermeasure priority determination unit performs countermeasure priority determination processing based on time-series changes in the malignancy.

12. The connection destination malignancy determination system according to claim 11,
wherein, as the countermeasure priority determination processing is performed based on the time-series changes in the malignancy, the countermeasure priority determination unit increases the countermeasure priority when the malignancy of the connection destination increases in time series.

13. The connection destination malignancy determination system according to claim 1, wherein the connection destination observation unit automatically configures the observation agents in different geographic regions to execute sandboxed analysis of downloaded content files, and the connection destination malignancy determination unit processes sandboxed analysis results to identify malicious behavior patterns specific to each geographic region.

14. The connection destination malignancy determination system according to claim 1, wherein the countermeasure priority determination unit integrates with network security infrastructure by automatically transmitting the blocking lists to firewalls, intrusion detection systems, and web proxies through secure communication protocols, and receives feedback from the network security devices to update the priority calculations.

15. The connection destination malignancy determination system according to claim 1, wherein the connection destination malignancy determination unit performs real-time correlation analysis between the regional observation results and known attack patterns stored in a threat intelligence database, and automatically adjusts malignancy scores based on the correlation analysis results.

16. The connection destination malignancy determination system according to claim 1, wherein the observation agents are configured to perform deep packet inspection of network traffic to and from the connection destinations, and the connection destination observation unit analyzes communication protocols, payload characteristics, and traffic volume patterns to detect evasive malicious behavior.

17. The connection destination malignancy determination system according to claim 1, wherein the connection destination malignancy determination unit maintains a dynamic reputation database that tracks historical malignancy scores and regional response patterns for each connection destination over time, and uses machine learning models trained on historical data to predict future malicious activity.

18. The connection destination malignancy determination system according to claim 1, wherein the countermeasure priority determination unit implements adaptive priority weighting algorithms that automatically adjust priority calculations based on organizational security policies, asset criticality levels, and current threat landscape conditions received from external threat intelligence feeds.

19. A connection destination malignancy determination program applied to a connection destination malignancy determination system connected to the Internet via a network, the program causing a computer to implement:

a connection destination observation function for observing a connection destination using observation agents located in multiple geographic regions;

a connection destination malignancy determination function for determining a malignancy indicating a degree of maliciousness of the connection destination; and a countermeasure priority determination function for determining a countermeasure priority indicating a degree of preferential countermeasure required based on the malignancy, regional differences in observation results from the multiple geographic regions, and an observation result of the connection destination, wherein the connection destination observation function observes connection destinations by instructing multiple observation agents to access URLs and receive observation results including status codes, content files, and file formats, wherein the connection destination malignancy determination function determines malignancy by executing machine learning algorithms that analyze downloaded executable files, detect malicious scripts in web pages, compare time-series response changes, and evaluate regional response differences, and wherein the countermeasure priority determination function calculates priority values using automated algorithms that process malignancy data and observation results to generate blocking lists for network security devices.

20. A connection destination malignancy determination method applied to a connection destination malignancy determination system connected to the Internet via a network, the method comprising:

a connection destination observation step for observing a connection destination using observation agents located in multiple geographic regions;

a connection destination malignancy determination step for determining a malignancy indicating a degree of maliciousness of the connection destination; and a countermeasure priority determination step for determining a countermeasure priority indicating a degree of preferential countermeasure required based on the malignancy, regional differences in observation results from the multiple geographic regions, and an observation result of the connection destination, wherein the connection destination observation step observes connection destinations by instructing multiple observation agents to access URLs and receive observation results including status codes, content files, and file formats, wherein the connection destination malignancy determination step determines malignancy by executing machine learning algorithms that analyze downloaded executable files, detect malicious scripts in web pages, compare time-series response changes, and evaluate regional response differences, and wherein the countermeasure priority determination step calculates priority values using automated algorithms that process malignancy data and observation results to generate blocking lists for network security devices.

* * * * *